(12) United States Patent
Friedenfelds et al.

(10) Patent No.: US 7,315,734 B2
(45) Date of Patent: Jan. 1, 2008

(54) METHOD FOR PERFORMING A PREDETERMINED ACTION ON WIRELESS CALLS BASED ON CALLER'S LOCATION

(75) Inventors: John Friedenfelds, Madison, NJ (US); Robert Ellis Richton, Madison, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 557 days.

(21) Appl. No.: 09/764,121

(22) Filed: Jan. 19, 2001

(65) Prior Publication Data

US 2002/0098844 A1    Jul. 25, 2002

(51) Int. Cl.
*H04M 11/04*    (2006.01)

(52) U.S. Cl. ............... 455/404; 455/412; 455/456; 455/428; 455/456.1; 379/532; 379/45

(58) Field of Classification Search ............ 455/445, 455/734, 404, 466.1, 466.02, 457, 458, 459, 455/412, 456, 521, 528, 456.1, 414, 532, 455/428, 456.3, 414.1, 414.2; 342/357.1, 342/357.2, 359.09, 359.08, 352.05, 357.06; 379/45, 51, 201, 532

See application file for complete search history.

(56) References Cited

U.S. PATENT DOCUMENTS

| | | | | |
|---|---|---|---|---|
| 5,570,412 | A * | 10/1996 | LeBlanc | 455/456.2 |
| 5,596,625 | A * | 1/1997 | LeBlanc | 455/404.2 |
| 5,600,706 | A * | 2/1997 | Dunn et al. | 455/456.2 |
| 5,815,808 | A | 9/1998 | Valentine | |
| 5,926,133 | A * | 7/1999 | Green, Jr. | 342/363 |
| 5,930,713 | A * | 7/1999 | Nguyen | 455/440 |
| 5,960,341 | A * | 9/1999 | LeBlanc et al. | 455/426.1 |
| 5,969,678 | A * | 10/1999 | Stewart | 342/457 |
| 6,005,870 | A * | 12/1999 | Leung et al. | 370/466 |
| 6,035,187 | A * | 3/2000 | Franza | 455/404.1 |
| 6,070,083 | A * | 5/2000 | Watters et al. | 455/517 |
| 6,091,956 | A * | 7/2000 | Hollenberg | 455/456.5 |
| 6,115,596 | A * | 9/2000 | Raith et al. | 455/404.2 |
| 6,138,026 | A * | 10/2000 | Irvin | 455/456.3 |
| 6,198,938 | B1 * | 3/2001 | Chavez, Jr. | 455/519 |
| 6,233,445 | B1 * | 5/2001 | Boltz et al. | 455/404.2 |
| 6,259,405 | B1 * | 7/2001 | Stewart et al. | 342/457 |
| 6,442,394 | B1 * | 8/2002 | Valentine et al. | 455/456.3 |
| 6,466,796 | B1 * | 10/2002 | Jacobson et al. | 455/456.3 |
| 6,470,181 | B1 * | 10/2002 | Maxwell | 455/413 |

(Continued)

FOREIGN PATENT DOCUMENTS

WO    9831168    1/1998

OTHER PUBLICATIONS

Meyer et al., "Wireless Enhanced Sep. 1, 2001 Service-Making It a Reality," Bell Labs Technical Journal, Autumn 1996, Murray Hill, NJ, pp. 188-202.

(Continued)

*Primary Examiner*—William Trost
*Assistant Examiner*—Julio Perez

(57)    ABSTRACT

In the method of performing a predetermined action on wireless calls, a determination of whether a received wireless call falls within a defined area is made. If the received wireless call falls within the defined area, then the predetermined action, such as screening, is performed on the call. For example, the call is connected with an audio message.

3 Claims, 2 Drawing Sheets

U.S. PATENT DOCUMENTS

| | | | |
|---|---|---|---|
| 6,512,922 B1* | 1/2003 | Burg et al. | 455/432.1 |
| 6,529,722 B1* | 3/2003 | Heinrich et al. | 455/404.1 |
| 6,567,671 B2* | 5/2003 | Amin | 455/415 |
| 6,731,940 B1* | 5/2004 | Nagendran | 455/456.1 |
| 7,050,567 B1* | 5/2006 | Jensen | 379/266.01 |
| 2002/0006787 A1* | 1/2002 | Darby | 455/419 |
| 2002/0006788 A1* | 1/2002 | Knutsson et al. | 455/422 |
| 2002/0068549 A1* | 6/2002 | Tender | 455/414 |
| 2002/0077130 A1* | 6/2002 | Owensby | 455/466 |
| 2002/0128033 A1* | 9/2002 | Burgess | 455/528 |
| 2005/0286688 A1* | 12/2005 | Scherer | 379/88.21 |

OTHER PUBLICATIONS

European Search Report, EP 01306906.7, issued Feb. 6, 2002.

* cited by examiner

METHOD FOR PERFORMING A PREDETERMINED ACTION ON WIRELESS CALLS BASED ON CALLER'S LOCATION

FIELD OF THE INVENTION

The present invention relates to telecommunications in general, and more particularly, to a wireless telecommunications system that performs a predetermined action, such as screening, on calls based on the caller's location.

BACKGROUND OF THE INVENTION

Serious problems arise these days when emergencies occur because so many people have wireless phones and feel they can help as "good Samaritans" by calling in the emergency. Because emergency networks are, of necessity and practicality, limited, many "good Samaritans" calling to report an emergency can overload and saturate the emergency network. As a result, other, perhaps more serious, emergencies cannot be reported.

SUMMARY OF THE INVENTION

In the method of performing a predetermined action on wireless calls according to the present invention, a class of wireless calls is established for having the predetermined action (e.g., screening) performed thereon, and wireless calls in this class then have this action performed thereon. For example, when the class of wireless calls is emergency wireless calls, an area including a known incident is established. The wireless communication system is then instructed to route calls originating from the defined area to, for example, an audio message. In this manner, the emergency network handling emergency calls does not overload.

BRIEF DESCRIPTION OF THE DRAWINGS

The present invention will become more fully understood from the detailed description given herein below and the accompanying drawings which are given by way of illustration only, wherein like reference numerals designate corresponding parts in the various drawings, and wherein.

DETAILED DESCRIPTION OF THE PREFERRED EMBODIMENTS

The present invention is directed to a method and apparatus for performing a predetermined action on wireless calls based on the caller's location. For the purposes of discussion only, the application of the method and apparatus according to the present invention to emergency networks will be described in detail. However, it should be understood, that the present invention is not limited to emergency networks. Additionally, the following exemplary embodiment uses screening as the predetermined action, but it should be understood that the present invention is not limited to screening the wireless calls.

Figure 1:
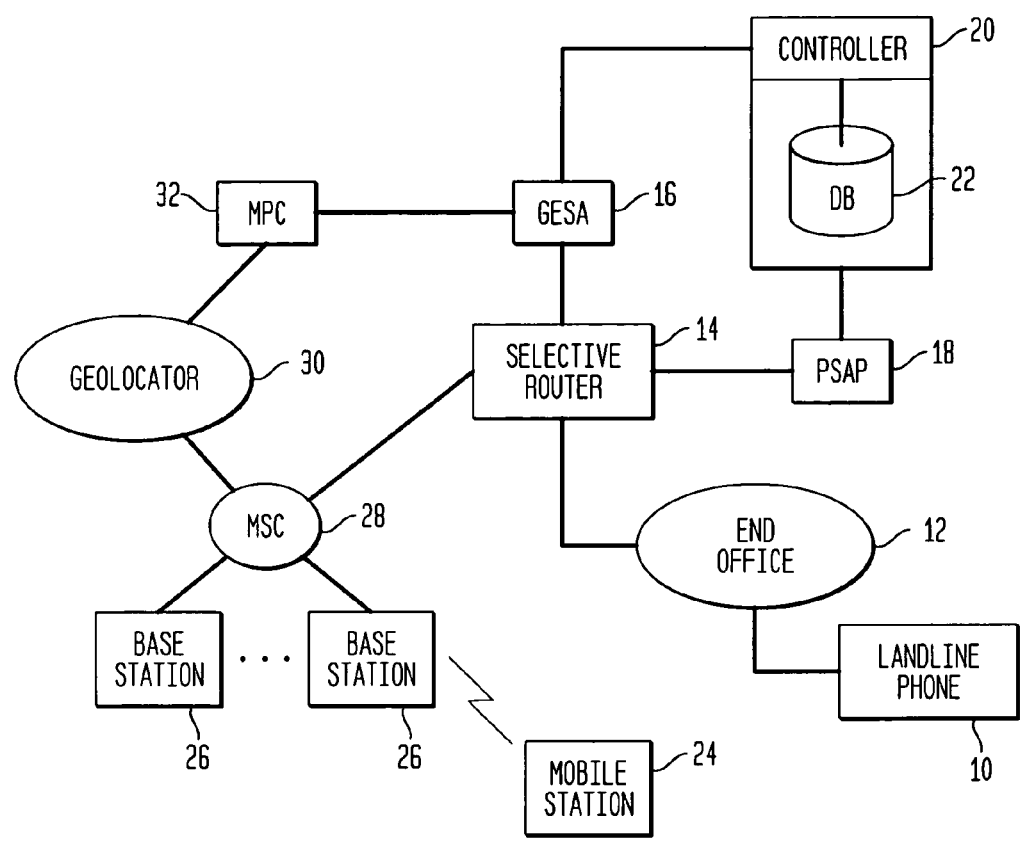
FIG. 1 illustrates a prior art proposed emergency network.

FIG. 1 illustrates a prior art proposed emergency network. When a landline emergency call (e.g., a 911 call) is made from a landline phone 10, an end office 12 directs the call to a selective router 14. Because the call is an emergency call, the selective router 14 contacts a geographic emergency service adjunct (GESA) 16. The GESA 16 maps the phone number of the landline phone 10 to a Public Safety Answering Point (PSAP) designated to handle emergency calls from the landline phone 10. The GESA 16 then outputs a control signal based on the determination, and the selective router 14 routes the call from the landline phone 10 to the appropriate PSAP 18 in response to the control signal.

When the PSAP 18 receives the call, the PSAP 18 contacts the controller 20, and provides the controller 20 with the phone number of the landline phone 10. The controller 20 controls an automatic location information database 22, which stores the geographic address (e.g., street number, street name, etc.) of landline phones. In response to being contacted by the PSAP 18, the controller 20 controls the database 22 to provide the address of landline phone 10 to the PSAP 18.

When an emergency call is made from a mobile station (e.g., wireless or mobile phone) 24, a base station 26 receives the call and forwards the call to a mobile switching center (MSC) 28. Because the call is an emergency call, the MSC 28 sends the call to the selective router 14.

Unlike landline phones 10, mobile stations 24 are not necessarily associated with a particular geographic address or even a geographic area. Accordingly, the MSC 28 provides a geolocator 30 with sufficient information to determine the location of the mobile station 24 using any well-known geolocation technique. While the geolocator 30 has been shown as a logically separate structure from the MSC 28, it will be understood that the geolocator 30 could form part of the MSC 28, base station 26 or even other network entities—indeed the geolocator function may even reside in the mobile station 24. The geolocator 30 provides the location of the mobile station 24 to a mobile position center (MPC) 32, which tracks the position of mobile stations 24. The MPC 32 can store the location information from the geolocator 30 in the same format as provided by the geolocator 30, or can convert the location information from the geolocator 30 into location information usable by the PSAP 18 (e.g., street numbers and names and/or landmarks like exits and intersections of roadways).

When the selective router 14 receives the emergency call from the MSC 28, the selective router 14 contacts the GESA 16. Because the call is a wireless call, the GESA 16 accesses the MPC 32 to determine the location of the mobile station 24. Based on the location information, the GESA 16 determines the PSAP handling emergency calls for that geographic area in which the mobile station 24 is located. If the MPC 32 stores location information in the format provided by the geolocator 30, as opposed to location information usable by the PSAP 18, then the GESA 16 converts the location information. The GESA 16 then outputs a control signal based on the determination, and the selective router 14 routes the call to the appropriate PSAP 18 in response to the control signal.

The GESA 16 also notifies the controller 20 of the geographic location of the mobile station 24, and the controller 20 stores this information in the database 22 in association with the mobile station's identifier (e.g., phone number). The controller 20 also controls the database 22 to provide the location information to the PSAP 18. It will be understood that the PSAP 18 associates location information from the database 22 with a particular emergency wireless call based on the mobile station's identifier.

Figure 2:
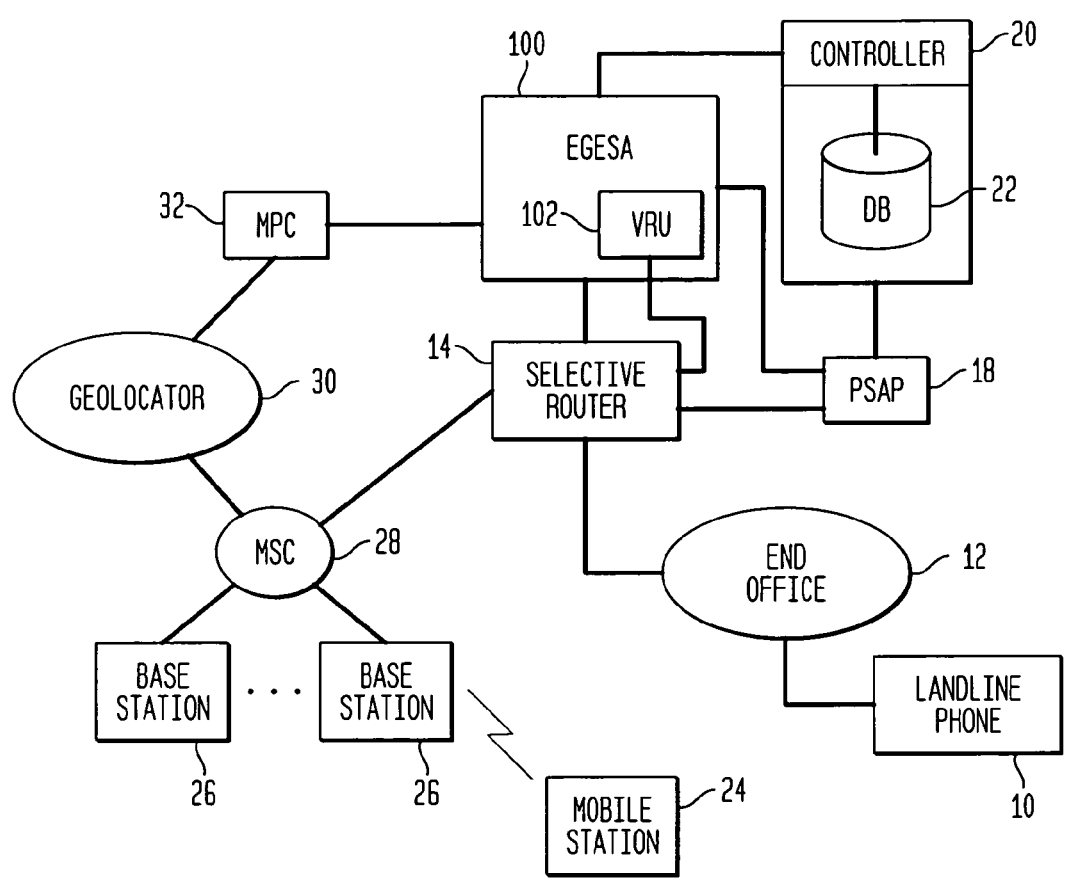
FIG. 2 illustrates an emergency network according to the present invention.

Next, the structure and operation of the method and apparatus according to the present invention will be described with respect to FIG. 2. The emergency network of FIG. 2 is the same as the emergency network of FIG. 1, except that an enhanced GESA (EGESA) 100 has replaced the GESA 16. Accordingly, only the differences between the emergency network of FIG. 1 and FIG. 2 will be described for the sake of brevity.

As shown in FIG. 2, the EGESA 100 is additionally connected to the PSAP 18, and includes a voice response unit (VRU) 102.

The operation of the emergency network of FIG. 2 will now be described according to a first method of the present invention. Except for the screening operation discussed in detail below, the EGESA 100 operates in the same manner as the GESA 16.

When a PSAP 18 receives an emergency wireless call in the same manner as discussed above with respect to FIG. 1, the operator at the PSAP 18 has the option of initiating call screening. If the operator decides to initiate call screening, the PSAP operator sends instructions to the EGESA 100 to initiate call screening in association with the received wireless call. Besides identifying the wireless call associated with the call screening request, the instructions include a threshold distance (e.g., $\frac{1}{4}^{th}$ of a kilometer) and a time period (e.g., 15 minutes) provided by the PSAP operator. The instructions also include first and second text message portions generated by the PSAP operator. The first text message is a brief description of the emergency, which is the subject of the emergency wireless call, and the second text message is a brief description of the location of the emergency.

In response to the call screening request from the PSAP 18, the EGESA 100 determines a screening area. From the wireless call identified in the call screening request, the EGESA 100 obtains the location of the wireless call from the MPC 32. Then, the EGESA 100 determines the screening area as a circle centered at the location of the wireless call and having a radius equal to the threshold distance. It should be recognized that other, more complicated shapes such as polygons could be used instead of circles. These polygons may be governed by road networks, rivers, or other geographic features.

Next, the EGESA 100 examines the position information of each subsequently received emergency wireless call to determine if the received emergency wireless call falls with a screening area. If a wireless call falls within the screening area, the EGESA 100 controls the selective router 14 to route the call to the VRU 102. The VRU 102, using known text-to-voice techniques, plays an audio message having the following format: "If you are calling to report the" {first text message} "at or near" {second text message} "we have already dispatched personnel to the incident. If you are reporting a different incident, please stay on the line, and your call will be answered as soon as possible."

If the wireless call pertained to the same incident discussed in the audio message, the caller will terminate the call. If upon termination of the audio message, the wireless caller does not terminate the wireless call for a predetermined period of time (e.g., 5 or 6 seconds), the EGESA 100 controls the selective router 14 to route the wireless call to the PSAP 18.

The above described screening process is carried out for the call screening request for the period of time specified in the instructions received from the PSAP 18.

Furthermore, at any time during the call screening process, the PSAP operator can change the threshold distance and/or the time period.

Numerous alternatives to the above described embodiment exist. For example, instead of the PSAP 18 providing the threshold distance and the period of time to perform screening (hereinafter "screening period"), the EGESA 100 uses a default threshold distance and a default period of time. As a further alternative, the EGESA 100 includes a table of threshold distances and screening periods associated with geographic areas, and uses the threshold distance and screening period for the geographic area including the location of the emergency wireless call upon which the screening request was based. In another alternative embodiment, the PSAP operator does not supply the period of time over which to conduct the screening. Instead, the PSAP operator issues a second instruction to disable the screening operation.

With respect to any of the above-noted alternatives and initially discussed operation, performance can be monitored and the thresholds modified to improve performance.

As a still further alternative, the VRU 102 generates the audio message without having to receive text messages from the PSAP 18. In this alternative, the VRU 102 replaces the first text message in the audio message with the word "incident" and uses the location information for the emergency wireless call upon which the screening request was based as the second text message.

Next, a second method embodiment of the present invention will be described with respect to the FIG. 2. The second method embodiment differs from the above-described first method embodiment in that the EGESA 100 automatically initiates call screening (i.e., initiates call screening without input from the PSAP 18). In this embodiment, the EGESA 100 examines the location of each received wireless call. When (i) a number of emergency wireless calls (e.g., five) have been received within a predetermined period of time (e.g., 5 minutes) and (ii) the emergency wireless calls are located within a predetermined distance of one another, the EGESA 100 initiates call screening for subsequently received wireless calls. To determine if conditions (i) and (ii) are met, the EGESA 100 records each emergency wireless call received with last predetermined period of time (e.g., within the last five minutes) on a map of the total geographic area served by the EGESA 100. The EGESA 100 then determines circular areas called establishment areas having a predetermined radius about each emergency wireless received within the last predetermined period of time. If any one establishment area includes the number of emergency wireless calls or greater, the EGESA 100 initiates call screening.

In initiating call screening, the EGESA 100 determines the center location of the emergency wireless calls falling within the establishment area, and determines the screening area as a circle having the center location as its center and the predetermined radius as its radius. However, it will be understood that the radius of the screening area can differ from the radius of the establishment areas.

If subsequently received emergency wireless calls originate from the screening area, then the EGESA 100 instructs the selective router 14 to route the emergency wireless call to the VRU 102. The VRU 102 issues the audio message, which does not require PSAP 18 input, as described above with respect to first method embodiment; wherein the location of one of the number of emergency calls having its location closest to the center location is used as the second text message. The EGESA 100 causes the selective router 14 to connect the emergency wireless call with the PSAP 18 in the same manner as discussed above after the audio message is played.

Furthermore, the EGESA 100, optionally, notifies the PSAP 18 that call screening has gone into effect and for what geographic area. As a further modification, the PSAP 18 could then choose to override the call screening, and have the EGESA 100 route potentially screenable calls to the PSAP 18.

As with the first method embodiment, it will be appreciated that numerous alternatives exist. For example, the EGESA 100 maintains emergency wireless calls on the map for different periods of time depending on the location of the emergency wireless calls, and the EGESA 100 uses different radii to determine establishment areas depending on the location of the emergency wireless calls. Similarly, the EGESA 100 uses different radii to determine the screening area depending on the location of the center of the screening area. Also, the number of emergency wireless calls required to trigger call screening can change depending on the location of the emergency wireless calls.

Besides the alternatives discussed above with respect to each method embodiment of the present invention, alternatives applicable to both method embodiments will be readily apparent from the forgoing description. For example, the screening areas are not limited to being circles. And, as previously mentioned, the method according to the present invention is not limited to emergency wireless calls, but could be applied to another readily identifiable class of wireless calls such as location based incentive offers (sometimes called "electronic coupons"), wireless based games, wireless location based advertisements, etc. The readily identifiable class of wireless calls are identified by the number being called, but the invention is not limited to this method of identifying a class of calls.

Just as the services and implementation details of the invention may vary, the reference to the VRU should be understood to apply not just to voice response equipment, but also to analogous equipment that provides responses via text, data or any other form—even just a tone.

The invention being thus described, it will be obvious that the same may be varied in many ways. Such variations are not to be regarded as a departure from the spirit and scope of the invention, and all such modifications are intended to be included within the scope of the following claims.

We claim:

1. A method of performing an action on wireless calls, comprising:

receiving a wireless call;

determining whether the received wireless call falls within a class of wireless calls, the class of wireless calls being one of location incentive offers, wireless based games, and wireless location based advertisements; and performing a predetermined action on the received wireless call when the determining step determines that the received wireless call falls within the class of wireless calls, wherein the performing the predetermined action routes the received wireless call to a first location if the received wireless call falls within the class of wireless calls, the first location being at least one of an answering point and a voice response unit, and the received wireless call is routed to a second location if it does not fall within in the class of wireless calls, the second location being at least one of an answering point and a voice response unit and different from the first location.

2. The method of claim 1, further comprising: establishing the class of wireless calls.

3. The method of claim 1, wherein the action further includes screening the received wireless call.

* * * * *